United States Patent

Teraoka

[11] Patent Number: 5,219,054
[45] Date of Patent: Jun. 15, 1993

[54] HUB CLUTCH DEVICE

[75] Inventor: Masao Teraoka, Tochigi, Japan

[73] Assignee: Tochigifujisangyo Kabushiki Kaisha, Tochigi, Japan

[21] Appl. No.: 841,428

[22] Filed: Feb. 26, 1992

[30] Foreign Application Priority Data

Feb. 27, 1991 [JP] Japan .............................. 3-9726[U]

[51] Int. Cl.⁵ ............................................ F16D 25/04
[52] U.S. Cl. ................................ 192/67 R; 192/88 A
[58] Field of Search ............... 192/88 A, 85 V, 67 R; 180/247; 92/40

[56] References Cited

U.S. PATENT DOCUMENTS

| | | | |
|---|---|---|---|
| 2,477,233 | 7/1949 | Bristol | 92/40 X |
| 2,568,226 | 9/1951 | Drake | 92/40 |
| 4,625,846 | 12/1986 | Gomez | 192/88 A X |
| 4,627,512 | 12/1986 | Clohessy | 180/247 |
| 4,817,752 | 4/1989 | Lobo et al. | 192/88 A X |
| 4,960,192 | 10/1990 | Kurihara | 192/67 R |
| 5,085,304 | 2/1992 | Barroso | 192/67 R |
| 5,123,513 | 6/1992 | Petrak | 192/88 A X |

FOREIGN PATENT DOCUMENTS

| | | |
|---|---|---|
| 60-151103 | 8/1985 | Japan . |
| 61-238516 | 10/1986 | Japan . |
| 0156140 | 6/1989 | Japan ............................. 180/247 |
| 0182133 | 7/1989 | Japan ............................. 180/247 |

*Primary Examiner*—Rodney H. Bonck
*Attorney, Agent, or Firm*—Graham & James

[57] ABSTRACT

A hub clutch device for connecting and disconnecting an axle and a wheel in a part time four-wheel drive vehicle, includes a wheel hub having a flange portion secured to the wheel, a hollow spindle secured to a vehicle body, and a roller member positioned between the wheel hub and the hollow spindle. A housing with a gear portion covers an outer side of the wheel hub and defines a first sealed chamber. A bellows with a second sealed chamber being substantially vacuum is provided with a spring member pressing the bellows in an axial direction. A sliding gear always engaging the gear portion of the housing is axially movable according to a motion of the bellows to connect the axle with the wheel in a rotational direction. A pressure producing unit is provided to move the bellows against a spring force of the spring member.

3 Claims, 1 Drawing Sheet

HUB CLUTCH DEVICE

BACKGROUND OF THE INVENTION

The present invention relates to a hub clutch device for connecting and disconnecting a drive axle and a wheel of a vehicle to and from each other.

As a conventional hub clutch device of the kind referred to above, there is one disclosed in, for example, Japanese Patent Laid-Open No. 60-151103. The hub clutch device is one in which a clutch mechanism for connecting and disconnecting an axle and a wheel of a four-wheel drive (4WD) vehicle to and from each other operates by an actuator.

The hub clutch device is arranged such that a flexible diaphragm forming an actuator is provided between the axle and a top portion of a housing, a pressure chamber is defined on the side of the axle, and an air chamber is defined on the side of the top portion of the housing.

The hub clutch device is arranged such that the clutch mechanism is connected and disconnected by deflection or flexure of the diaphragm due to pressure supply to the pressure chamber.

By the way, there is a fear that, since the air chamber is closed, malfunction occurs in the hub clutch device by a change in volume of the air chamber attendant upon a change in temperature due to a brake temperature, an outside air temperature and the like. Further, an operating pressure is also raised so that durability of a seal and the like is lowered.

In view of the above, an arrangement is disclosed in Japanese Patent Laid-Open No. SHO 61-238516 in which a return spring is arranged within the air chamber, and an air bore is provided for opening to the atmosphere, so that when the actuator operates, or a temperature changes, air can enter and exit through the air bore.

However, there is a fear that, as water or dust entering the air chamber through the air bore is frozen or solidified, the function of the hub clutch device may be lowered, or the hub clutch device may become inoperable, due to malfunction of the actuator.

SUMMARY OF THE INVENTION

It is an object of the invention to provide a hub clutch device capable of preventing malfunction due to temperature change from occurring and capable of preventing water, dust and the like from entering the air chamber so that a normal function can be maintained.

According to the invention, there is provided a hub clutch device for connecting and disconnecting an axle and a wheel in a part time four-wheel drive vehicle, comprising:

a wheel hub having a flange portion secured to the wheel;

a hollow spindle secured to a vehicle body, defining a fluid passage with the axle;

a roller member positioned between said wheel hub and said hollow spindle;

a housing covering an outer side of said wheel hub, defining a first sealed chamber communicating with the fluid passage, having a gear portion at an inner peripheral portion;

a bellows having a second sealed chamber being vacuum or substantially vacuum, secured to said housing;

a spring member pressing said bellows in a axial direction;

a sliding gear always engaging the gear portion of said housing, being axially movable according to a motion of said bellows to engage a gear part of the axle to connect the axle with the wheel in a rotational direction; and means for producing pressure to move said bellows against a spring force of said spring member in the axial direction by transmitting the pressure through the fluid passage to the first sealed chamber.

DETAILED DESCRIPTION OF THE PREFERRED EMBODIMENT

Figure 1:
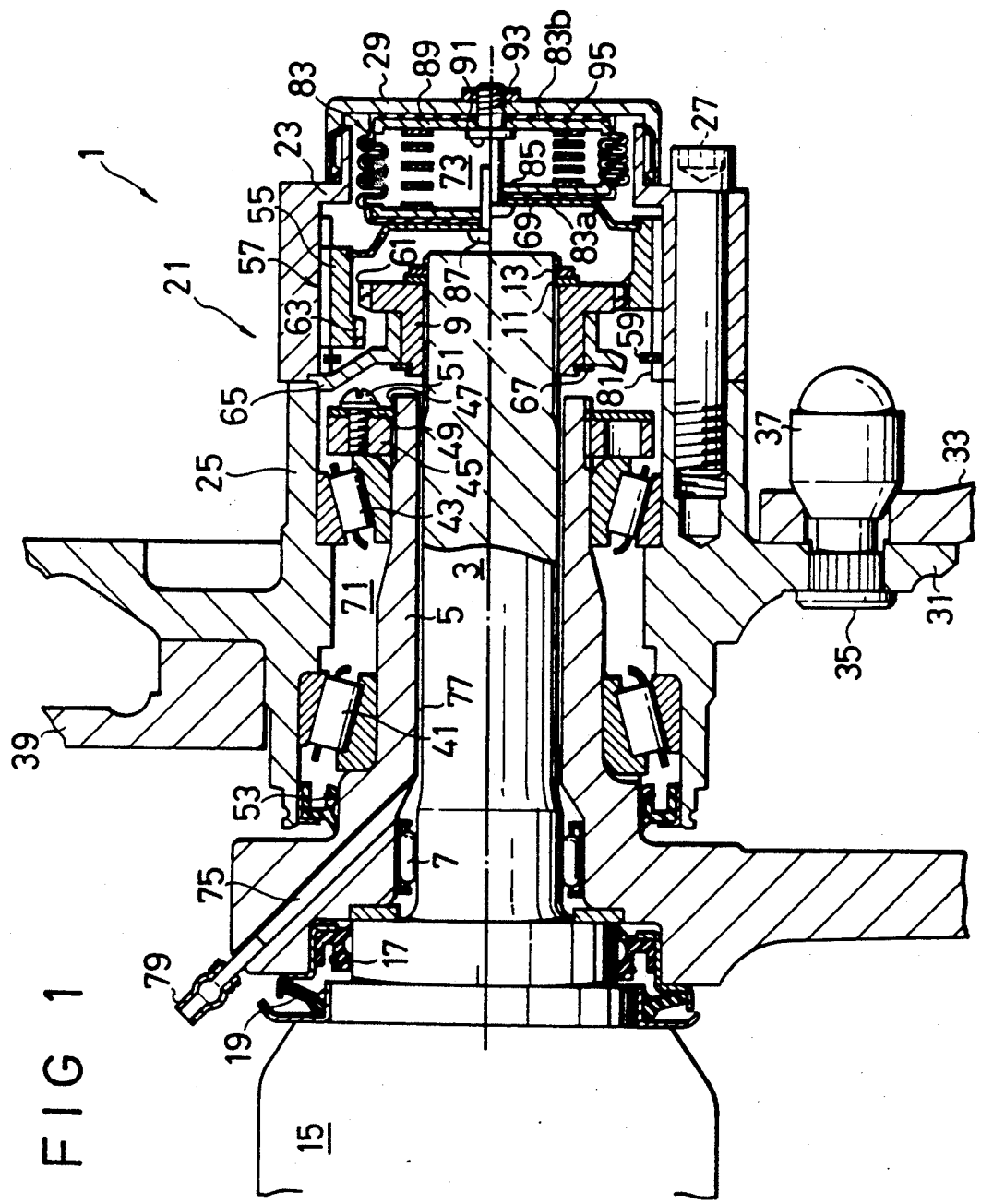
FIG. 1 is a longitudinal cross-sectional view showing an embodiment of a hub clutch device according to the invention.

An embodiment of the invention will hereunder be described with reference to the drawing.

FIG. 1 is a cross-sectional view of a hub clutch device of an embodiment according to the invention.

The hub clutch device 1 according to the invention is, for example, one used on the side of a right-hand front wheel of a part-time four-wheel drive vehicle in which the front wheel is on the cutting-off side. In this connection, left- and right-hand directions are left- and right-hand directions with respect to this vehicle and in FIG. 1.

As shown in FIG. 1, an axle 3 is supported within a hollow spindle 5 on the side of a vehicle body, through a bearing 7. A drive gear 9 is spline-connected to a right-hand end of the axle 3. Positioning and prevention of coming-off or slipping-out of the drive gear 9 are done by a retaining ring 11 and a snap ring 13. Further, a left-hand end of the axle is connected to a constant-velocity coupling 15. An oil seal 17 and a dust-prevention seal 19 are mounted on a location between the axle 3 and the spindle 5.

A housing 21 comprises a cylindrical top portion 23 and a wheel hub 25 which are connected together by a bolt 27. An end cover 29 is gas-tightly mounted on the top portion 23. A wheel 33 for the right-hand front wheel is fixedly mounted on a flange 31 of the wheel hub 25 by a bolt 35 and a nut 37, and a brake disc 39 is fixedly mounted on the flange 31 by a bolt.

The housing 21 is supported by a pair of bearings 41 and 43 which are arranged on the side of an outer periphery of the spindle 5. The spindle 5 has a forward end thereof, and a thrust-adjusting nut 45 is threadedly engaged with an outer periphery of the forward end of the spindle 5. A detent 49 engaged with a groove 47 is fixedly mounted on the nut 45 by a bolt 51. An oil seal 53 is mounted between the spindle 5 and the housing 21 at a location to the left-hand of the bearing 41.

A ring-like slide gear or connecting element or member 55 is connected to an inner periphery of the housing 21 by a spline section 57 arranged between the slide gear 55 and the top portion 23 of the housing 21 for axial movement. A retaining ring 59 is mounted on an inner periphery of the top portion 23 to restrict a left-hand moving range of the slide gear 55.

A pair of splines 61 and 63 engageable with and releasable from each other are arranged respectively on an outer periphery of the drive gear 9 and an inner periphery of the slide gear 55. When the slide gear 55 is moved to a position or connecting position indicated in a lower half portion of FIG. 1, the splines 61 and 63 are in mesh with each other, while, when the slide gear 55 is moved to a position or disconnecting position indicated in an upper half portion of FIG. 1, mesh between the splines 61 and 63 is released. At the connecting position, the axle 3 and the right-hand front wheel are connected to each other through the slide gear 55, so that the right-hand front wheel is capable of being driven by an engine. Furthermore, at the disconnecting position, the right-hand front wheel is detached from or cut off from the axle 3 so as to become a free rotating condition.

A center plate 65 is mounted between the housing 21 and the drive gear 9 in a manner allowing sliding movement in a rotational direction. A retaining ring 67 for the center plate 65 is mounted on the drive gear 9. Centering between the drive gear 9 and the housing 21 is executed by the center plate 65, so that engagement and disengagement of the splines 61 and 63 with and from each other are executed smoothly.

A pressure chamber 71 is defined within the housing 21 by the seal 53. An air passage 77 is defined between the outer periphery of the axle 3 and the inner periphery of the spindle 5. The air passage 77 communicates with the pressure chamber 71 on a right-hand side, while the air passage 77 communicates with an orifice 75 provided in the spindle 5 on a left-hand side. The orifice 75 is connected to an air pump (pressure producing unit) from a connecting pipe 79 through an air hose (not shown). An opening 81 is provided in the center plate 65, and air passes through the opening 81 when the hub clutch device 1 operates.

A expandable vacuum bellows 83 for defining a closed chamber 73 and having a vacuum interior is provided between the axle 3 and the end cover 29. The vacuum bellows 83 has a left-hand side wall 83a which is put between an annular plate 85 arranged within the vacuum bellows 83 and a plate 69 having an outer peripheral edge engaged with the slide gear 55. The vacuum bellows 83 has a center portion which is gas-tightly connected by a pin 87. Moreover, the vacuum bellows 83 has a right-hand side wall 83b which is put between an annular plate 89 arranged within the vacuum bellows 83 and the end cover 29, and which has a center portion which is gas-tightly connected by a bolt 91 and a nut 93. The pin 87 and the nut 91 cooperate with each other to form stopper means for restricting shrinkage or contraction of the vacuum bellows 83 at the connecting position of the slide gear 55.

A return spring or biasing member 95 for biasing the slide gear 55 to the disconnecting position is arranged between the plate 69 and the end cover 29 at a location within the vacuum bellows 83.

The vacuum bellows 83 can freely be contracted and expanded because there is almost no change in pressure within the bellows interior even if there is a change in temperature and a change in volume. Thus, the hub clutch device 1 operates smoothly, and no malfunction due to the change in temperature and the change in volume occurs.

Further, since the interior of the hub clutch device 1 is completely cut off from the atmosphere, foreign matters from the outside such as rain, liquid mud, dust and the like do not enter into the hub clutch device 1. Thus, there is no lowering in function of the hub clutch device 1.

In the hub clutch device 1 arranged as described above, when the vehicle runs in two-wheel drive, the left- and right-hand front wheels are disconnected from the engine by a 2-4 switching mechanism, and the left- and right-hand front wheels are disconnected respectively from axles by the hub clutch devices so that the left- and right-hand front wheels are brought to a free-rotation condition. Accordingly, vibration, noises, reduction or lowering of fuel consumption, wearing or abrasion of various sections of the front-wheel drive system, and the like can be prevented from occurring.

Further, when the vehicle runs in four-wheel drive (4WD), the left- and right-hand front wheels are connected to the engine by the 2-4 switching mechanism, and the left-and right-hand front wheels are connected respectively to the axles by the hub clutch devices. Accordingly, rectilinear stability and running ability of the vehicle can be improved.

Operation described above can manually be operated. The operation may be formed so as to be capable of automatic operating in accordance with a road-surface condition and a maneuvering condition.

In connection with the above, the closed member chamber 73 within the vacuum bellows 83 may be brought to a complete vacuum condition or to a substantially vacuum condition. That is, the closed chamber 73 may exclude air or other gas to such a degree to avoid having such gasses influence operation of the bellows 83.

Furthermore, the above-described embodiment has been described with reference to a case where the hub clutch device 1 is applied to the right-hand front wheel. However, the invention should not be limited to this specific embodiment. The invention may be applied to the left-hand front wheel or each of the rear wheels.

What is claimed is:

1. A hub clutch device for connecting and disconnecting an axle and a wheel in a part time four-wheel drive vehicle, comprising:
    a wheel hub having a flange portion secured to the wheel;
    a hollow spindle secured to a vehicle body, defining a fluid passage with the axle;
    a roller member positioned between said wheel hub and said hollow spindle;
    a housing covering an outer side of said wheel hub, defining a first sealed chamber communicating with the fluid passage, having a gear portion at an inner peripheral portion;
    a bellows having a second sealed chamber being vacuum or substantially vacuum, the bellows including a first end secured to said housing and a second end moveable in an axial direction;
    a spring member for displacing said second end of said bellows in an axial direction;
    a sliding gear which engages the gear portion of said housing, the sliding gear being secured to the second end of said bellows and being movable according to a motion of the second end of said bellows to engage a gear part of the axle to connect the axle with the wheel in a rotational direction; and
    means for producing pressure to move said bellows against a spring force of said spring member in the axial direction by transmitting the pressure through the fluid passage to the first sealed chamber, wherein the spring member biases the second end of said bellows so as to disengage said sliding gear from the gear part of the axle.

2. The hub clutch device according to claim 1, wherein said spring member is disposed inside the second sealed chamber.

3. The hub clutch device according to claim 1, further comprising a center plate holding a concentricity between the axle and said housing.

* * * * *